United States Patent [19]

Deretchin

[11] 4,152,466

[45] May 1, 1979

[54] STABLE HOMOGENEOUS PEANUT BUTTER TABLE SYRUP

[76] Inventor: Benjamin B. Deretchin, MD #1, Helms Hill Rd., Washingtonville, N.Y. 10992

[21] Appl. No.: 919,473

[22] Filed: Jun. 27, 1978

[51] Int. Cl.² ............................................. A23L 1/09
[52] U.S. Cl. ................................. 426/613; 426/633; 426/658
[58] Field of Search ..................... 426/613, 658, 633

[56] References Cited

U.S. PATENT DOCUMENTS

| | | | |
|---|---|---|---|
| 1,890,180 | 12/1932 | Hoffman | 426/633 |
| 3,057,734 | 10/1962 | Pader | 426/658 |
| 3,282,707 | 11/1966 | Topalain et al. | 426/658 |
| 3,362,833 | 1/1968 | Smith | 426/658 |
| 3,897,262 | 7/1975 | Carlson | 426/658 |
| 3,903,311 | 9/1975 | Billerbeck et al. | 426/633 |
| 3,995,068 | 11/1976 | Billerbeck et al. | 426/633 |
| 4,073,963 | 2/1978 | Daggy | 426/658 |

*Primary Examiner*—Jeanette M. Hunter

[57] ABSTRACT

The present invention relates to a stable, homogeneous peanut butter table syrup and a method for making the same. The method involves combining a xanthan gum peanut oil slurry with water and blending with peanut butter and a sweetener composition at elevated temperatures.

9 Claims, No Drawings

STABLE HOMOGENEOUS PEANUT BUTTER TABLE SYRUP

BACKGROUND OF THE INVENTION

The prior art reveals a number of table syrups containing various flavoring additives and materials.

Typical of the prior art flavored table syrups are those commonly referred to as buttered syrup and those containing honey, maple syrup and fruit syrups. These are all generally water solutions or oil in water emulsions. Such syrups are described in U.S. Pat. No. 3,057,734 to Pader, U.S. Pat. No. 3,282,707 to Topalion et al., U.S. Pat. No. 3,362,833 to Smith and U.S. Pat. No. 4,073,963 to Daggy. However, none of these patents discloses a peanut butter flavored table syrup.

The use of peanut butter as a flavoring in syrup creates many problems. As the various ingredients employed in peanut butter are normally naturally derived, they are complex mixtures of a variety of materials having different physical and chemical properties. For example, peanuts are a combination of vegetable oils which are hydrophobic and lipophylic and proteins which are hydrophylic and lipophobic. Syrups which are a combination of saccharides and water, are of course hydrophylic. In addition, the sugars and fats are both independently crystallizable, so that the final product is a complex combination of disparate compounds. Therefore, it is found that care must be taken in combining the various compounds and, frequently, in the materials used, so that the final product is substantially homogeneous and shelfstable.

THE INVENTION

It has now been discovered that a stable homogeneous peanut butter containing table syrup may be prepared by forming a slurry of xantham gum and peanut oil, hydrating the xanthan gum in the slurry by mixing the slurry with water while subjecting the slurry and water mixture to agitation, mixing a sugar syrup with the peanut oil, xanthan gum and water slurry and heating the mixture, dispersing peanut butter in the heated mixture, adding additional sugar syrup to adjust the solids content to the desired level with additional syrup, while maintaining the temperature and then cooling the syrup.

Although the prior art has shown attempts to use various gums such as propylene glycol, alginate, carboxy methyl cellulose, carrageenan, locust bean gum, guar gum, gelatin, xanthan gum, pectin and the like to stabilize oil in water emulsions most of these have been unsuccessful. Daggy of U.S. Pat. No. 4,037,963 teaches that the thickener type gums were incompatible with the syrups of his invention.

In the present invention it was therefore surprising to find that xanthan gum stabilized not only the peanut oil but also the peanut butter to prevent separation.

The sweetener component of the present composition may consist of any of the normal sweeteners used to prepare table syrups such as sugar, corn syrup, high fructose corn syrup or combinations thereof.

The peanut butter component may be any commercially available peanut butter of the smooth or creamy type.

The peanut oil component may be any commercially available clarified peanut oil.

In practicing the present invention the xanthan gum may be employed at levels of about 0.07 to 0.13 percent by weight and preferably at about 0.1 percent by weight.

The peanut oil may be employed at a level of about 0.25 to 0.6 percent by weight and preferably at about 0.4 percent by weight.

The peanut butter is employed at a level of about 9.5 to 11.0 percent by weight and preferably at about 10.5 percent by weight.

In carrying out the present invention the sequence of steps employed is of the most importance in obtaining the desired stable peanut butter flavored syrup composition. The xanthan gum and peanut oil are combined and formed into a slurry with agitation. The slurry of xanthan gum and peanut oil is than added to the water at ambient temperature with agitation and the agitation continued until the xanthan gum is hydrated, generally five to ten minutes.

One half of the syrup is added to the xanthan gum, peanut oil and water admixture and the combination is heated with agitation to about 150° F. When the temperature reaches about 150° F., the peanut butter is added to the combination with sufficient agitation to disperse the peanut butter. Although somewhat higher or lower temperatures may be employed, care must be exercised at higher temperatures to avoid a break-down of the peanut butter—syrup system before the xanthan gum stabilizes the same.

When the peanut butter has been completely dispersed, the remaining syrup and salt are added and the total combination is heated to about 190° F. to provide a bacteriologically stable product. Preferably the Brix of the syrup is adjusted to 67° Brix and the product is then packaged, preferably at about 190° F.

If desired potassium sorbate at about 0.05 percent by weight dissolved in just sufficient water to dissolve the same may be added just prior to packaging as a preservative.

In addition to the above, it has been unexpectedly found that the addition of about 0.4% citric acid to the final composition substantially enhances the sweetness thereof.

The peanut butter syrup of the invention and a method for producing it are further illustrated in the following examples:

EXAMPLE 1

The formula for a typical peanut butter table syrup product of the present invention is shown below:

|  | Per cent by weight |
| --- | --- |
| High fructose corn syrup (42% fructose, 71% solids) (Isomerose 100 Brand high fructose corn syrup mfd. by Clinton Corn Processing Co. div. of Standard Brands, Inc., New York, N.Y.) | 77.00 |
| Water | 10.70 |
| Peanut Butter (creamy) | 10.50 |
| Salt | 1.30 |
| Peanut oil | 0.40 |
| Xanthan gum (Keltrol mfd. by Kelco Co., San Diego, Ca.) | 0.10 |

EXAMPLE 2

The procedure used for making the peanut butter table syrup of the present invention was a follows:

The peanut oil and xanthan gum were charged to a steam jacketed vessel and then agitated with the stirrer blades rotating at about 200–400 r.p.m. for about 5 to 10 minutes until a slurry was formed.

The slurry was then combined with water at abient temperature and the agitation continued with the stirrer blades rotating at about 200–400 r.p.m. for about 5 to 10 minutes until the xanthan gum hydrated.

One half of the high fructose corn syrup to be used was charged to the vessel containing the xanthan gum, peanut oil, water mixture and the temperature increased to 150° F. while maintaining agitation.

When the temperature reaches 150° F., the peanut butter was added and agitation continued until the peanut butter was dispersed.

The remaining syrup and the salt then added and blended in with agitation.

The mixture was then heated to 190° F. while maintaining agitation at which time the Brix was adjusted to 67° and the product packaged.

Although the foregoing invention has been described above by way of illustration and example for purposes of clarity of understanding, it is to be apparent to one skilled in the art that certain changes and modifications may be practiced with the spirit of the invention.

What is claimed is:

1. A stable, homogeneous peanut butter containing table syrup comprising
   about 77% by weight sweetener component,
   about 10.7% by weight water,
   about 9.5 to 11% by weight of peanut butter,
   about 0.25 to 0.6% by weight of peanut oil and
   about 0.07 to 0.13% weight of xanthan gum.

2. The product of claim 1 wherein
   the peanut butter is at a level of about 10.5% by weight,
   the peanut oil is at a level of about 0.4% by weight, and
   the xanthan gum is at a level of 0.1% by weight.

3. The product of claim 2 wherein the sweetener component is sucrose.

4. The product of claim 2 wherein the sweetener component is a blend of sucrose and corn syrup.

5. The product of claim 2 wherein the sweetener component is high fructose corn syrup.

6. The product of claim 2 wherein the sweetener component is a blend of sucrose and high fructose corn syrup.

7. A method of preparing a stable, homogeneous peanut butter containing table syrup which comprises:
   mixing about 0.07 to 0.13% by weight of the total component of xanthan gum with 0.25 to 0.6% by weight of peanut oil with agitation to form a slurry,
   adding said slurry of xanthan gum and peanut oil to about 10.7% by weight of water at ambient temperature;
   agitating said mixture of water and the slurry of xanthan gum and peanut oil for about 5 to 10 minutes to hydrate said xanthan gum;
   adding about 38% by weight of sweetener component and heating with agitation to increase the temperature to about 150° F.;
   adding about 9.5 to 11.0% by weight of peanut butter and continue agitation until said peanut butter is dispersed;
   adding about 39% by weight of sweetener component and about 1.3% by weight of salt to the composition containing the peanut butter and heating the resulting composition to about 190° F. with agitation; and packaging the product.

8. The method of claim 7 wherein about 0.05% by weight of potassium sorbate dissolved in a small quantity of water is added prior to packaging.

9. The method of claim 8 wherein 0.05% by weight of citric acid is added just prior to packaging.

* * * * *